United States Patent
Pruvot et al.

(10) Patent No.: US 7,427,759 B1
(45) Date of Patent: Sep. 23, 2008

(54) METHOD OF IDENTIFYING AN INFRARED MATRIX SENSOR

(75) Inventors: Henri Pruvot, Paris (FR); Bernard Ruocco-Angari, Paris (FR)

(73) Assignee: Sagem Defense Securite Le Ponant de Paris, Paris (FR)

( * ) Notice: Subject to any disclaimer, the term of this patent is extended or adjusted under 35 U.S.C. 154(b) by 0 days.

(21) Appl. No.: 11/491,870

(22) Filed: Jul. 24, 2006

(30) Foreign Application Priority Data

Jul. 22, 2005 (FR) .................................. 05 07847

(51) Int. Cl.
*G01J 5/02* (2006.01)
(52) U.S. Cl. .................................. 250/338.1
(58) Field of Classification Search ............... 250/332, 250/338.1
See application file for complete search history.

(56) References Cited

U.S. PATENT DOCUMENTS 5,594,248 A * 1/1997 Tanaka ..................... 250/332

2005/0006481 A1   1/2005  Han et al.
2005/0213838 A1 * 9/2005  Kuramoto .................. 382/254

FOREIGN PATENT DOCUMENTS

DE         36 29 009         3/1988

OTHER PUBLICATIONS

Preliminary Search Report dated Apr. 20, 2006, Appl. No. FR 0507847.

* cited by examiner

*Primary Examiner*—David P. Porta
*Assistant Examiner*—Marcus H Taningco
(74) *Attorney, Agent, or Firm*—McCracken & Frank LLP

(57) ABSTRACT

Method of identifying an infrared matrix sensor, characterized in that, for at least some of the pixels of the sensor matrix, information concerning the position of the pixel in the matrix is recorded and information concerning at least one characteristic of each of the pixels is determined, and in that all of these pairs of information associated with the respective pixels (or mapping) are kept in memory as sensor identifier information.

15 Claims, No Drawings

METHOD OF IDENTIFYING AN INFRARED MATRIX SENSOR

FIELD OF THE INVENTION

The present invention relates to the field of infrared matrix sensors, and it relates more particularly to improvements made in the field of identification of such sensors, in particular for traceability purposes.

DESCRIPTION OF THE ART

Infrared matrix sensors are components that are used in making strategic devices such as infrared cameras, homing devices for missles or similar armaments, aiming devices for firing arms, etc.

To prevent the proliferation of sensitive technologies, states (such as France, the USA, etc.) manufacturing infrared matrix sensors and/or manufacturing hardware incorporating such sensors have enacted regulatory provisions stipulating that all infrared matrix sensors which are manufactured in or imported to their country should be identified with certainty to allow traceability.

To this end, the identification of each matrix sensor has hitherto been made by an external marking, mechanical in particular, or by an internal marking by means of software incorporated in the sensor. However, the drawback of the current practice lies in the possibility, for a third party, of obtaining access to the marking and then in the possibility of falsifying, altering or purely and simply eliminating the marking (particularly for the external marking), so that the traceability of the sensor cannot be strictly ensured.

Moreover, the infrared matrix sensors produced hitherto are of the cooled type and require the implementation of cryostatic equipment to enable them to be operated. Such cryostatic equipment constitutes a severe constraint which considerably limits the applications of these components, which continue to be mainly limited to military applications. Given these conditions, the problems of traceability affect a relatively small number of sensors, which, in addition, are encountered in relatively supervised hardware.

However, changing techniques mean that it is now possible to manufacture or envisage manufacturing non-cooled infrared matrix sensors. The considerably simplified implementation of non-cooled sensors leads to augur a considerable expansion of their fields of use and it is foreseeable that these components will in the near future find applications within mass-market consumer hardware. At the present time, there is nothing to prevent a sensor used in commonly available hardware being taken for re-use in sensitive devices such as weapons, and the current marking systems which are lacking in reliability cannot ensure effective traceability of this type of sensor.

SUMMARY OF THE INVENTION

The main object of the invention is to propose an improved and simple solution with which it becomes possible to fully satisfy the requirements of the practice of traceability, regardless of the sensor type, whether cooled or non-cooled.

To this end, the invention proposes a method of identifying an infrared matrix sensor, which is characterized in that, for at least some of the pixels of the sensor matrix, information concerning the position of the pixel in the matrix is recorded and information concerning at least one characteristic of each of said pixels is determined, and in that all of these pairs of information associated with said respective pixels (or mapping) are kept in memory as sensor identifier information.

DETAILED DESCRIPTION OF THE INVENTION

Thus, each infrared matrix sensor can be tracked through characterization. Any attempt to modify the sensor to adapt it to a signature different from its own would entail physically modifying the sensor, a modification that would be destructive. Conversely, by analyzing the physical characteristics of an unidentified sensor it becomes possible, by comparison with the signature kept in memory in particular by the manufacturers, to ascertain the origin of the sensor and facilitate the reconstruction of its path trace.

In addition, it will be noted that it may be possible to successfully recognize a signature even if the sensor is partially damaged.

The term "characteristic" is used to denote a quantity specific to the pixel, either by its nature—for example, the defective or active state of the pixel—or by its level or value—for example the gain value of the pixel, the offset value of the pixel, the noise level of the pixel, etc. Although the nature and/or the value of the characteristic will not be specific to the pixel concerned, the mapping (that is, all the pairs of position information plus characteristic information of the respective pixels in the sensor matrix) generated from this characteristic can itself, either be specific to the sensor including said pixels and this mapping is then representative of this one sensor, or be specific to a group of sensors (such as the sensors originating from a given supplier). In both cases, the representativeness of the mapping with respect to a sensor or group of sensors is bivalent with a very high certainty factor provided that there are enough pixels involved in this mapping.

As a security measure, it is preferable for the mapping kept in memory to be encoded, this encoding being performed in any appropriate manner with any required complexity, so as to reduce the possibility of an unauthorized third party obtaining access to the mapping.

It is possible to ensure that the mapping concerns all the pixels of the matrix having the characteristic. Thus, for example, if the selected characteristic is the defective state of the pixel, then the mapping of all the defective pixels present in the sensor matrix is recorded and kept in memory; if the selected characteristic is the gain or the noise level of the pixel, then the mapping recorded and kept in memory encompasses all the pixels of the sensor matrix.

However, in order to simplify and speed up the process of identifying a sensor, and to reduce the volume of the data to be kept in memory, it may prove more sensible for the mapping to concern only some, chosen by location, of the pixels of the matrix having said characteristic. The locations of the selected pixels in the matrix can be chosen randomly or on the contrary according to any desirable, more or less complex law. Regarding the number of pixels selected, it is enough for this number to be high enough to dispose of any risk that a third party can find them, but also low enough compared to the total number of the pixels of the sensor for said simplification to be significant compared to processing all the pixels of the sensor matrix. As an example, it will be possible in practice to select a number of pixels between 0.1% and 1% of the total number of pixels in the sensor matrix.

If an individual mapping is assigned to each sensor, it is observed that, whatever the solution adopted and in view of the high, even very high, number of pixels in a matrix, the probability of the matrices of two sensors having the same mapping is infinitesimal, this probability decreasing exponentially as the size of the matrix increases.

As characteristic, it is possible to choose a quantity from various quantities of the pixel that are available.

One solution which seemingly ought to be interesting for its relative simplicity of implementation involves choosing, as characteristic, the state—defective or active—of the pixels of the matrix, and establishing a mapping of all or some of the defective pixels of the matrix.

The term "defective pixel" is used to denote a pixel with at least one quantity that is not as it should be for the pixel to be operational and/or that does not fall within a tolerance range previously established for an operational pixel: the pixel cannot then produce an image or a signal that can be used by the equipment located downstream. The defects can be of various types, in particular:

"dead" pixel: this is a pixel totally insensitive to a scene modulation, which belongs to one of the following subtypes:
  disconnected pixel (the pixel is no longer electrically linked with the read circuit and no signal is delivered),
  short-circuited pixel (the signal delivered is of a level that is so high that it is saturating);
noisy pixel, which belongs to one of the following subtypes:
  pixel having an excess average noise (average value throughout the noise band), that is, greater than a maximum allowable threshold (for example, twice the average of the noise over the whole of the sensor matrix),
  pixel having an excess very low frequency noise (an acceptable threshold is defined), or "blinking" pixel;
out-of-range pixel: this is a pixel for which the gain and/or the level differs significantly from the average of the pixels of the matrix and which consequently saturates for scene temperatures very different from those saturating the other pixels (at these temperatures, it becomes equivalent to a dead pixel).

It is then possible to envisage a mapping of defective pixels, for example pixels having one of the abovementioned defects or a combination of some of these defects, as a signature that can be assigned to the sensor.

One case that may appear simple to implement consists in processing the so-called "dead" defective pixels. From production, a matrix may contain between 1% and 0.1% of so-called dead defective pixels, which are distributed randomly within the matrix. For a matrix of 100 000 pixels, the number of randomly distributed dead pixels is thus of the order of 100 to 1000, which is sufficient for the mapping established over all or some of these naturally dead pixels to constitute a reliable signature for the sensor concerned. An additional benefit of this solution lies in the fact that any diminution in the number of dead pixels is impossible; this number may, admittedly, increase over time and over the life of the sensor, but the mapping will always include at least the initial mapping which will therefore remain identifiable throughout the life of the sensor.

However, in certain productions, the number of naturally defective pixels is too low, with more than 80% of the matrices having less than 0.02% defective pixels: it then becomes difficult to construct a meaningful signature with a mapping relating to such a small number of defective pixels.

To overcome this difficulty, an interesting variant of the inventive method no longer makes do with locating and counting the naturally defective pixels, but, in the sensor, defective pixels are created, arranged in a specific array that can serve as a signature. Advantageously, these defective pixels are created in at last one particular area of the sensor. This approach is based on the fact that it is commonplace for all the pixels of a sensor not to be used and for areas of the sensor, in particular around the edges of the sensor, to remain unused. For example, in a typical example of a sensor comprising a matrix of 320×256 pixels, it is possible to use and 16 top and bottom rows if it is used as a matrix of 320×240 pixels, or else it is possible to use the 64 left and right columns if it is used as a matrix of 256×256 pixels. In the case where the sensor matrix is used in its entirety, a row and/or a column at the edge of the sensor can be sacrificed: the field is admittedly reduced, but only by approximately 0.3% in the case of a matrix of 384×288 pixels which would be used as a matrix of 383×287 pixels, which remains quite compatible with the requirements.

In a context where defective pixels are created, consideration is more specifically given to creating an array of particular defective pixels, namely disconnected pixels. These disconnected pixels are particularly interesting inasmuch as they are unambiguous, unlike the dead pixels naturally present in the matrix. In practice, a disconnection (open circuit) is easy to detect, whether in the output signal (by a high or low saturated level) or in the uncorrected image (these pixels are located at the top or bottom of the dynamic range or grey levels), unlike a defective pixel of the dead pixel type which is relatively insensitive and/or too noisy. It is even possible to detect a disconnected pixel without bringing the sensor to its nominal operating temperature.

A disconnected or connected pixel is like a bit having respective 0 or 1 values. If, in the sensor matrix, a row of 320 pixels is sacrificed, 320 bits are then available for the encoding. If a peripheral area between the 320×256-pixel format of the full matrix and the 320×240 format of the matrix as used is sacrificed, 16×320 i.e. 5120 bits are then available for encoding, which is amply sufficient for the encoding requirements.

It is possible to envisage creating this type of defect identically in all the sensors, in other words, organizing the disconnected pixels in an identical way in all the sensors that will then have the same mapping of disconnected pixels. It might, for example, involve all the sensors originating from one and the same supplier and the common mapping might represent a signature of this supplier.

To do this, it is possible to use, in the sensor production process, a specific photolithographic mask including the topography of the pixels that must remain disconnected. This topographic code is entered into the definition of the individual mask of the sensor and repeated for each sensor in the mask of the semiconductor wafer (detector wafer or multiplexing wafer). In the case of sensors hybridized on a read circuit using indium beads or similar, it is possible, for example, to include this topographic code in the or each photomask used for deposition of the indium beads. Other solutions can be envisaged (for example, on deposition of metallic contact layers, etc.).

It is possible to envisage polarizing this common unique code by adding to it additional information, with which to distinguish the sensors. Thus, it is possible to provide photolithographic masks with patterns that would be different from each other in the sensor areas assigned to the encoding. For example, this additional information could be the coordinates of the sensor in the semiconductor wafer (wafer of the read circuit or wafer of the detector). Then, each sensor would be, through the intermediary of appropriately mapped disconnected pixels, assigned a signature representative of the supplier and of its position (row-column) in the semiconductor wafer from which it is taken.

However, an individual signature can be put in place in each sensor, through the intermediary of an individual mapping of disconnected pixels, only by implementing an individual phase in the production process, at the cost of a significant complication of said production process.

To increase the security of identification of a sensor, it is also possible to provide for multiplying the signature code in one and the same sensor, at several locations of the latter.

Of course, it is possible to provide for combining created defective pixels with natural defective pixels for the purpose of increasing the number of defective pixels and/or complicating the mapping of the defective pixels, and therefore ultimately, in order to increase the security of the signature assigned to the sensor.

Pixel characteristics other than the defective state of the pixels can be selected to be used in the context of the invention, such as the offset value of the pixel, the noise level of the pixel, the gain of the pixel, and so on. Among these, the gain seems to constitute a characteristic that is relevant because of its very high stability over time. However, it is also essential to consider that the mappings based on such pixel characteristics are modified by the optical characteristics of the user system because:

of the optical transmission and its uniformity in the field,
of the spectral bandwidth and its uniformity in the field,
of the possible presence of vignetting,
and so on, and can evolve over time, for example when:
the quantum efficiency of the sensor changes,
the vacuum of the cryostat, in the case of cooled sensors, is degraded to the point that condensation appears on the focal plane,
and so on.

It must be stressed that one benefit of choosing as the characteristic one of the quantities specific to the pixels lies in the fact that these quantities are already determined to enable sensors to be employed: the location of the dead pixels is known; the gain, offset and noise values are measured for each pixel and are used to determine the gain, the offset, the noise of the sensor. It is thus sufficient to process as signatures this information that is already available.

It is also possible to envisage selecting, as pixel characteristic, a non-immediate data item, resulting from the application of a previously established process. In particular, it is possible to envisage a comparative process, such as that consisting in recording an initial mapping of a characteristic of the pixels placed in a given condition (for example at a given temperature), modifying said condition (for example, by changing the temperature) and recording the final mapping of this characteristic of the pixels, and finally retaining as the signature of the sensor, the mapping resulting from the comparison of the initial and final mappings.

As an example, the following can be envisaged: a mapping of sensor defects is established for the reference temperature of the focal plane; the operating point of the cooler is then shifted towards hotter temperatures and a new mapping of the defects is measured, which includes the initial defects plus additional defects induced by raising the temperature of the focal plane. The signature that can be assigned to the sensor can then be the mapping of the additional defects (that is, the difference between the final and original mappings).

Again by way of example, it is also possible to envisage applying the above process by shifting any other parameter from its nominal value, for example the bias point of the photodiodes.

Again by way of example, it is also possible to establish a mapping of saturating points when the sensor (on its own or in place in an item of hardware) is exposed to a temperature scene close to saturation (in the same way as the pixels have different gains or offset values, they also have different saturation thresholds).

Naturally, tougher signatures can be formed by combining a number of possible solutions.

What is claimed is:

1. A method of identifying an infrared matrix sensor,
   wherein first information relating to at least one characteristic of at least some of the pixels of the sensor matrix is recorded,
   wherein second information relating to the position of each of said at least some of the pixels in the sensor matrix is recorded,
   wherein said first information and second information associated with said respective pixels are paired,
   wherein said paired information is memorized (mapping) as an identifier means for identifying said infrared matrix sensor,
   wherein pixels are disconnected in at least one predetermined area of the sensor matrix according to a previously established pattern, and
   wherein the resulting mapping is memorized as a signature of a supplier of the infrared matrix sensor and/or an individual signature of the infrared matrix sensor itself.

2. The method according to claim 1, wherein said characteristic is a gain of the pixel.

3. The method according to claim 1, wherein said characteristic is an offset value of the pixel.

4. The method according to claim 1, wherein said characteristic is a noise level of the pixel.

5. A method of identifying an infrared matrix sensor,
   wherein first information relating to at least one characteristic of at least some of the pixels of the sensor matrix is recorded,
   wherein second information relating to the position of each of said at least some of the pixels in the sensor matrix is recorded,
   wherein said first information and second information associated with said respective pixels are paired,
   wherein said paired information is memorized (mapping) as an identifier means for identifying said infrared matrix sensor,
   wherein an initial mapping of said characteristic of said pixels placed in a given condition is recorded,
   wherein then said condition is modified,
   wherein then a final mapping of said characteristic of said pixels placed in said modified condition is recorded,
   wherein said initial and final mappings are compared, and
   wherein a result mapping resulting from said comparison is memorized as a signature of the supplier of the infrared matrix sensor and/or an individual signature of the infrared matrix sensor itself.

6. A method of identifying an infrared matrix sensor,
   wherein at least some pixels are disconnected in at least one predetermined area in the sensor matrix according to a previously established pattern,
   wherein information relating to the position of said disconnected pixels in the matrix is recorded (mapping), and
   wherein said mapping is memorized as a signature of the supplier of the infrared matrix sensor and/or an individual signature of the infrared matrix sensor itself.

7. The method according to claim 6, wherein said mapping is encoded.

8. The method according to claim 6, wherein said mapping relates to all the pixels of said at least one predetermined area of the matrix.

9. The method according to claim 6, wherein sad mapping relates only to some of the pixels of said at least one predetermined area of the matrix.

10. A method of identifying an infrared matrix sensor,
wherein first information relating to at least one characteristic of at least some of the pixels of the sensor matrix which are placed in a given condition is recorded,
wherein second information relating to the position of each of said at least some of the pixels of the sensor matrix which are placed in said given condition is recorded,
wherein said first information and second information associated with said respective pixels placed in said given condition are respectively paired (initial mapping) and are recorded,
wherein then said condition of said pixels is modified,
wherein then a further mapping (final mapping) of this characteristic of said pixels is recorded,
wherein said initial and final mappings are compared and
wherein a result mapping resulting from said comparison is memorized as a signature of a supplier of said infrared matrix sensor and/or an individual signature of said infrared matrix sensor itself.

11. The method according to claim 10, wherein said mapping is encoded.

12. The method according to claim 10, wherein said characteristic is a defective state of the pixel.

13. The method according to claim 10, wherein said characteristic is a gain of the pixel.

14. The method according to claim 10, wherein said characteristic is an offset value of the pixel.

15. The method according to claim 10, wherein said characteristic is a noise level of the pixel.

* * * * *